United States Patent [19]
Chen

[11] Patent Number: 5,970,758
[45] Date of Patent: Oct. 26, 1999

[54] AUTOMOBILE STEERING LOCK

[75] Inventor: Wen-Chaun Chen, Tainan, Taiwan

[73] Assignee: Chan Hau Enterprise Co., Ltd., Taipei Hsien, Taiwan

[21] Appl. No.: 09/190,291

[22] Filed: Nov. 13, 1998

[51] Int. Cl.[6] .................................................. B60R 25/02
[52] U.S. Cl. .................................. 70/209; 70/213; 70/312
[58] Field of Search ............................. 70/209, 211, 213, 70/225, 226, 237, 238, 312

[56] References Cited

U.S. PATENT DOCUMENTS

| | | | |
|---|---|---|---|
| 4,866,959 | 9/1989 | Hsu | 70/312 |
| 5,168,732 | 12/1992 | Chen et al. | 70/209 |
| 5,661,991 | 9/1997 | Hsu | 70/312 |
| 5,671,619 | 9/1997 | Hou | 70/209 |

*Primary Examiner*—Darnell M. Boucher

[57] ABSTRACT

An automobile steering lock includes a body member, a housing and a lock means. The locking means is contained in a lock housing in the housing, and consists of a base, plural number buttons, a press button, an adjust plate, plural wheels, a control plate, a press plate, a coil spring and a deadbolt. When the number buttons are all rotated to the preset coded number for unlocking, the press button can be pressed inward to force the press plate together with the deadbolt to move down to the unlocking position to free the housing from the body member. Thus this lock needs no keys, and the coded number is adjustable by a user, preventing the lock from being pried open by thieves.

4 Claims, 11 Drawing Sheets

AUTOMOBILE STEERING LOCK

BACKGROUND OF THE INVENTION

This invention relates to an automobile steering lock, particularly to one having a lock means with number buttons for controlling locking and unlocking of the lock means, getting rid of the trouble of carrying a key for unlocking, and acquiring anti-theft purpose by freely changing the code number for unlocking.

Figure 1:
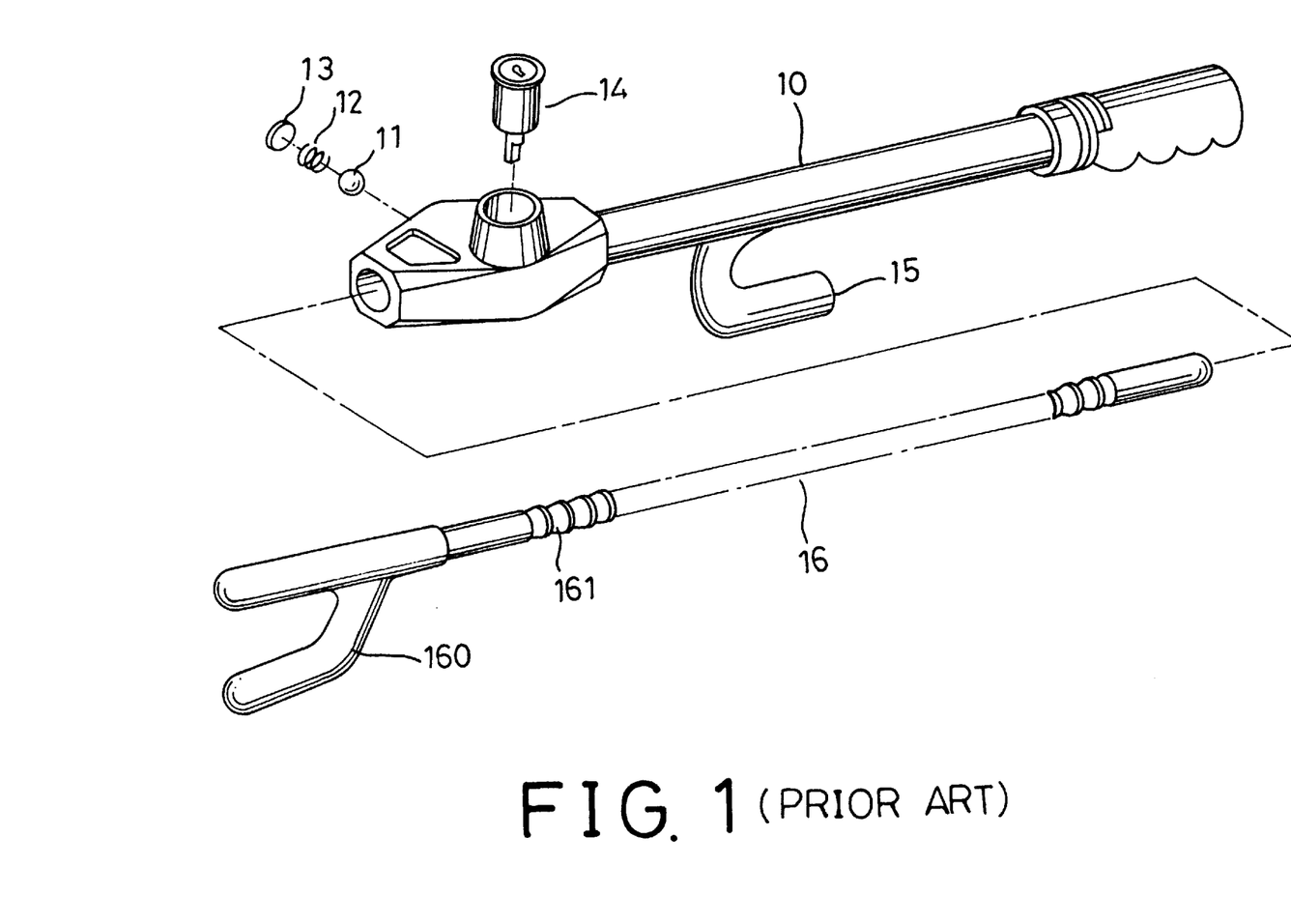
FIG. 1 is an exploded perspective view of a known conventional automobile steering lock.

Many conventional automobile steering locks have been in use, and one of them is shown in FIG. 1, including body member 10, a bearing 11, a spring 12, a cap 13 and a locking means 14 orderly fitted in a side of the body member 10, a hook 15 formed in a lower end of the body member 10, an elongate rod member 16 able to telescope in the body member 10 and having a hook 160 formed in a front end. The elongate rod member 16 has a plurality of annular grooves 161, and the body member 10 forms a sticking rod.

In using this conventional automobile steering lock, it is placed on the steering wheel of an automobile, with the hook 15 of the body member 10 hooking a portion of the steering wheel, with the locking means 14 unlocked, with the elongate rod member 16 pulled out of the body member 10 to let the hook 160 hooking an inner portion of the steering wheel, and then the locking means 14 is locked at that position. And locking and unlocking of the locking means 14 always needs a key, not convenient to use. Generally, most conventional automobile steering locks use a key for locking and unlocking. So when the key is lost, it may be very troublesome to use. Further, those kinds of automobile steering locks may be easily pried open by thieves to steel the automobile.

SUMMARY OF THE INVENTION

This invention has been devised to offer a kind of automobile steering lock needing no keys, getting rid of the trouble of carrying a key, by means of number buttons for managing locking and unlocking this automobile steering lock.

A feature of the invention is a locking means contained in a housing, and the locking means has a plurality of number buttons in a base to control a control plate to move, a press plate controlling the control plate to move back and forth and up and down. The press plate has one end pivotally connected to the base, and the other end movable up and down. A roller and a stop block are provided at a right side of the press plate, which has an engage groove formed in an upper portion. A coil spring is provided under the press plate for elastically moving up back the press plate after it is compressed. A deadbolt has a hook formed in a lower end engaging with a groove of the press plate, and the other end passing through the housing to extend in the body member. A press button has one end extending out of the locking means and the other end formed with a sloped surface resting on the roller of the press plate.

BRIEF DESCRIPTION OF DRAWINGS

This invention will be better understood by referring to the accompanying drawings, wherein.

DETAILED DESCRIPTION OF THE PREFERRED EMBODIMENT

Figure 2:
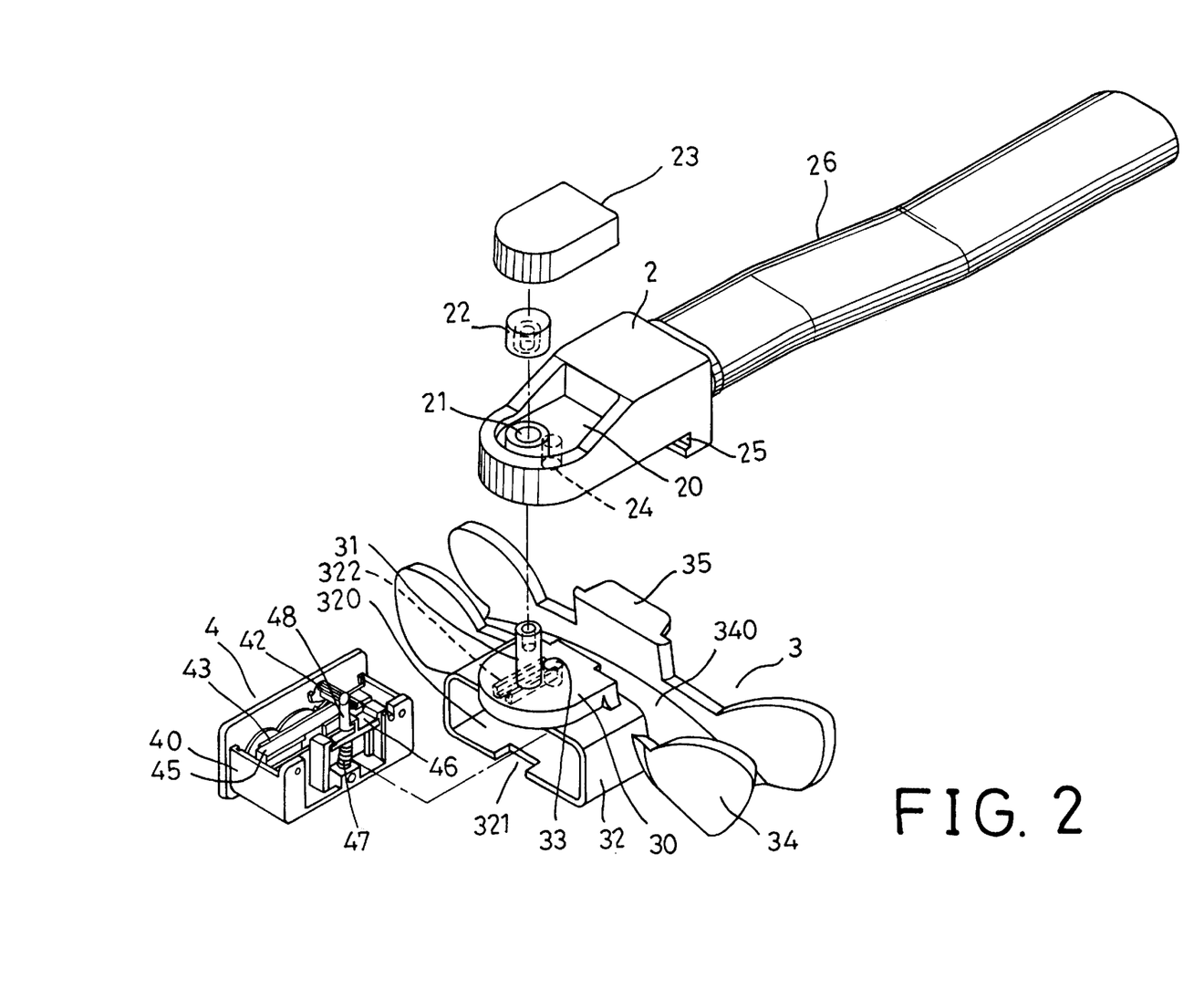
FIG. 2 is an exploded perspective view of an automobile steering lock in the present invention.
Figure 3:
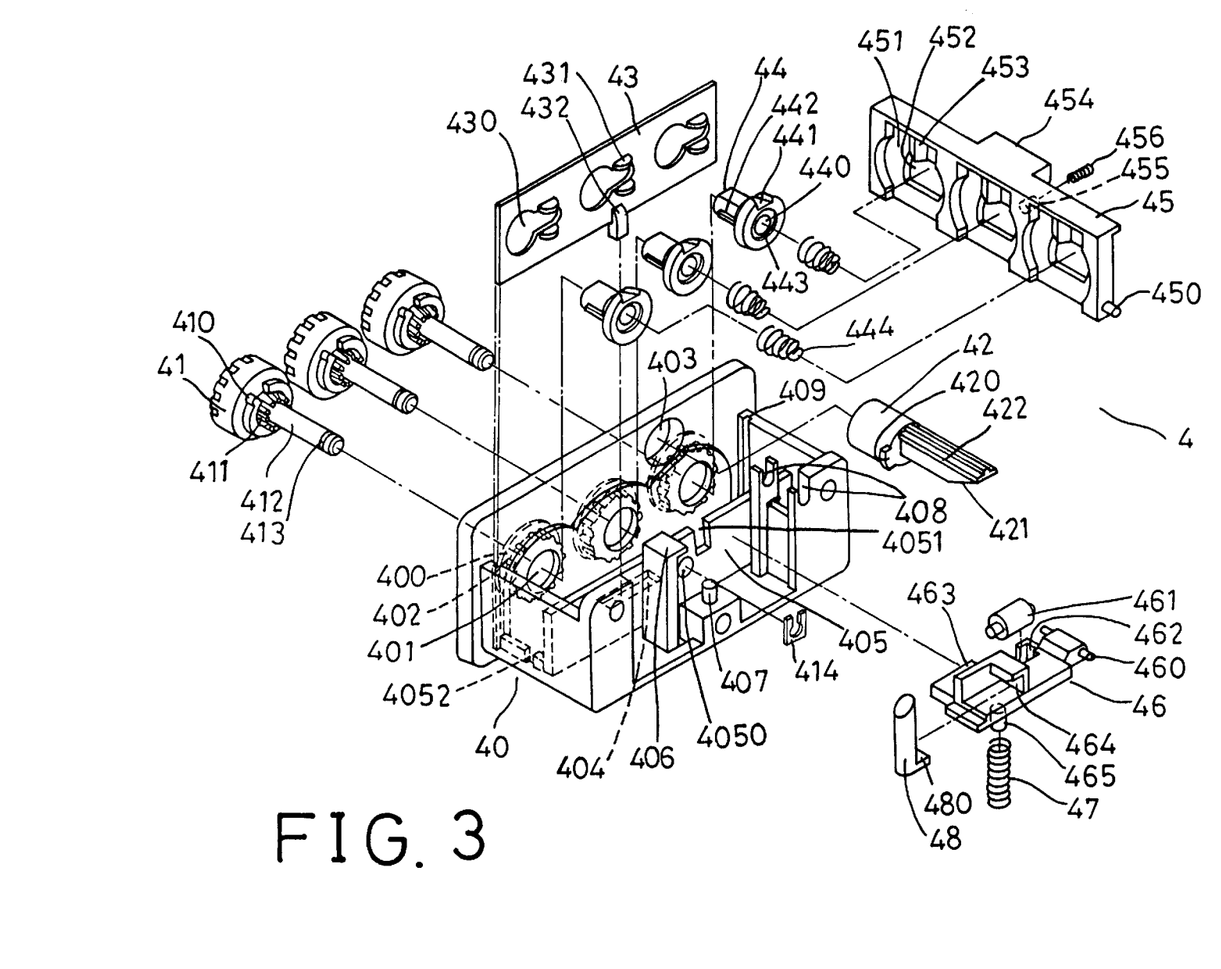
FIG. 3 is an exploded perspective view of a number matching device in the present invention.

A preferred embodiment of an automobile steering lock in the present invention, as shown in FIGS. 2 and 3, includes a body member 2, a housing 3, and a locking means 4 as main components combined together.

The body member 2 has a recess 20 formed in an upper surface, a vertical shaft hole 21 formed in the recess 20, a cap 22 fixed on the shaft hole 21, a decorative cover 23 covering on the recess 20, a lateral fitting groove 25 formed in a bottom rear portion, and a vertical deadbolt hole 24 formed in the bottom.

The housing 3 is pivotally connected to the body member 2, having a pivotal base 30 formed in an upper portion, an upright pivot 31 fixed on the pivotal base 30, a lock housing 32 formed in a lower portion, an opening 320 formed in a front side of the lock housing 32, a slot 321 formed in a front center of a bottom side of the lock housing 32, a rail 322 formed in an upper inner wall of the locking housing 32, a hole 33 formed in the pivotal base 30 and through the lock housing 32, two parallel cover walls 34 formed behind the rear side of the lock housing 32, an elongate curved hollow 340 formed between the two parallel cover walls 34 to fit a section of a steering wheel, an insert member 35 formed to extend horizontally outward from an upper side of the rear cover wall 34.

The locking means 4 is contained in the housing 3, consisting of a base 40, three number buttons 41, a press button 42, an adjust plate 43, three wheels 44, a control plate 45, a press plate 46, a coil spring 47, and a deadbolt 48.

The base 40 has three recessed grooves 400 formed in a front wall, a hole 401 in each groove 400, a plurality of small insert grooves 402 formed spaced apart equidistantly in an inner wall of each groove 400, a hole 403 formed above the left one of the three recessed grooves 400, a rectangular hole 404 formed in a bottom wall, a vertical fix plate 405 fixed on an intermediate portion parallel to the front wall, three shaft holes 4050 formed in the vertical fix plate 405, two slots 4051 formed in an intermediate portion of the vertical fix plate 405, a position aperture 4052 formed respectively in two opposite sides of the bottom of the vertical fix plate 405, a vertical stop plate 406 fixed behind the vertical fix plate 405, a vertical post 407 beside the stop plate 406 on the bottom of the base 40, two pivotal grooves 408 formed behind a right side of the vertical fix plate 405, and a vertical groove 409 formed respectively in two side walls.

The three number buttons 41 are respectively inserted in the recessed grooves 400 and the holes 401, having numerals engraved on a front surface, two insert projections 410 in a rear portion, a plurality of engage grooves 411 formed between each two projections annularly provided behind the insert projections 410, a guide rod 412 extending axially rearward from the center of each number button 41. The guide rod 412 further has an annular groove 413 near its end, with a lock washer 414 engaging the annular groove 413.

Then a press button 42 passes through the hole 403 of the front wall of the base 40, having a stop 420 respectively projecting at two sides of the front end, a sloped surface 421 formed on a bottom side of a rear portion, and plural parallel guide ridges 422 formed on an upper side of the rear portion.

An adjust plate 43 is located just behind the front wall of the base 40, having three slide holes 430 formed respectively with a round hole plus a long hole and a semi-round sidewise projections 431 respectively formed on and under the long hole portion of each slide hole 430 on an inner side, and a push rod 432 fixed at the bottom center.

Three wheels 44 are respectively fitted through the guide rod 412 of each number button 41, having a center hole 440, a slot 441 formed on an upper side, a key 442 formed respectively at two sides of a front portion, an annular groove 443 formed in a rear side wall for one end of a recovery spring 444 engaging the annular groove 443.

A control plate 45 is located in front of the fix plate 405 and behind the front wall of the base 40, having a sidewise post 450 respectively near a lower end of two sides, three recesses 451 spaced apart horizontally and respectively provided with a hole 452, a projection 453 formed on each hole 452, a projecting wall 454 extending from an upper center portion of a rear side, a hole 455 formed in a rear wall, and one end of a recovery spring 456 engaging the hole 455.

A press plate 46 is pivotally connected to the pivotal grooves 408 of the base 40, having two sidewise pivots 460 fitting in the pivotal grooves 408, an opening 462 defined by an L-shaped wall at one side for a roller 461 to be fitted therein, a stop flat plate 463 formed to extend from a front vertical wall, a fitting opening 464 formed between the bottom and an upper wall, an upright post 465 formed to extend down from the bottom.

A coil spring 47 fits around the upright post 465, and the post 407 of the base 40 as well.

A deadbolt 48 is located on the bottom of the press plate 46, having a hook 480 formed sidewise in a lower end to engage in the fitting opening 464.

Figure 4:
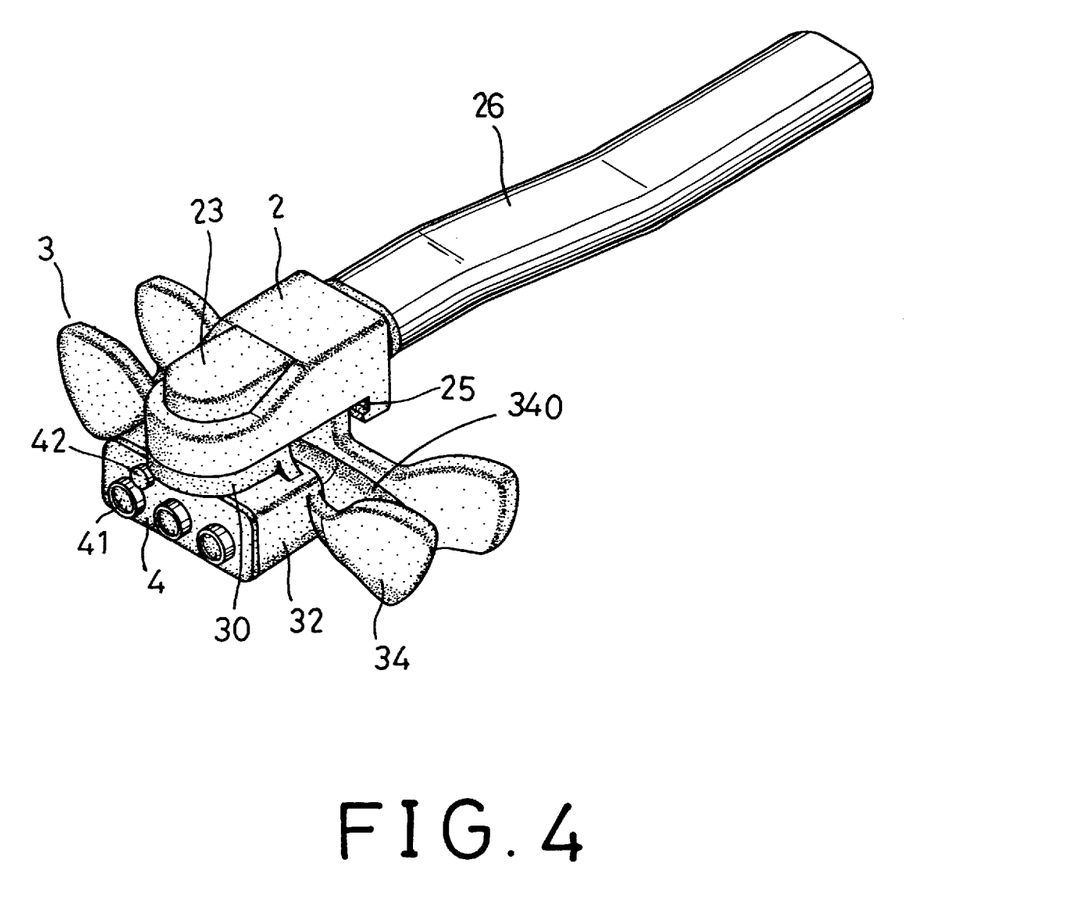
FIG. 4 is a perspective view of the automobile steering lock in the present invention.

In assembling the automobile steering lock, referring to FIGS. 2, 3 and 4, firstly the adjust plate 43 of the locking means 4 is placed just behind the front wall of the base 40, with one vertical side engaging one of the two vertical grooves 409, and with the push rod 432 extending through the rectangular hole 404 of the base 40. Next, the control plate 405 is placed in the base 40, and the three wheels 44 are respectively fitted in the three holes 401 of the base 40 and in the three recesses 451 of the control plate 45. Then the three number buttons, with the three slots 441 engaging the projections 453 of the control plate 45. Each spring 444 having a front end fitted in each wheel 44 has the other end passing through each hole 452 of the control plate 45 and resting on the wall of the fix plate 405 of the base 40. Then the recovery spring 456 in the hole 455 of the control plate 45 has its other end also rests on the wall of the fix plate 405. Now the three number buttons 41 are respectively inserted through the recessed grooves 400, with the insert projections 410 engaging one of the insert grooves 402 of the recessed grooves 400, with the guide rods 412 extending through the hole 401, through the holes 440 of the wheels 44, through the recovery springs 444, through the shaft hole 4050 of the fix plate 405, and secured at its position by means of the lock washers 414 engaging the annular grooves 413 of the guide rods 412. Meanwhile, the keys 442 of the wheels 44 engage the grooves 411 of the number buttons 41. Then the press plate 46 is placed in the rear upper portion of the base 40, with the two posts 460 pivotally fitted in the pivotal slots 408 of the base 40, with the coilspring 47 fitting around the post 465 and around the post 407 of the base 40 at the same time and elastically supporting the press plate 46. The press plate 46 is stopped by the stop plate 406 at its upper end. Then the press button 42 is inserted through the hole 43 of the base 40, with the sloped surface 421 resting on the roller 461 of the press plate 46. Now the deadbolt 48 is let its hook 480 hook in the fitting opening 464 of the press plate 46. Then the assembled locking means is positioned in the lock housing 32 of the housing 3 securely, with the top of the deadbolt 48 passing through the hole 33 of the pivotal base 30 and into the engage hole 24 of the body member 2, and with the guide block 422 of the press button 42 inserting in the rail 322 of the lock housing 32. Lastly the pivot 31 of the housing 3 is inserted in the shaft hole 21 of the body member 2, with the cap 22 fitting with the pivot 31, and with the decorative cover 23 is placed on the recess 20, finishing assemblage of this lock.

Figure 5:
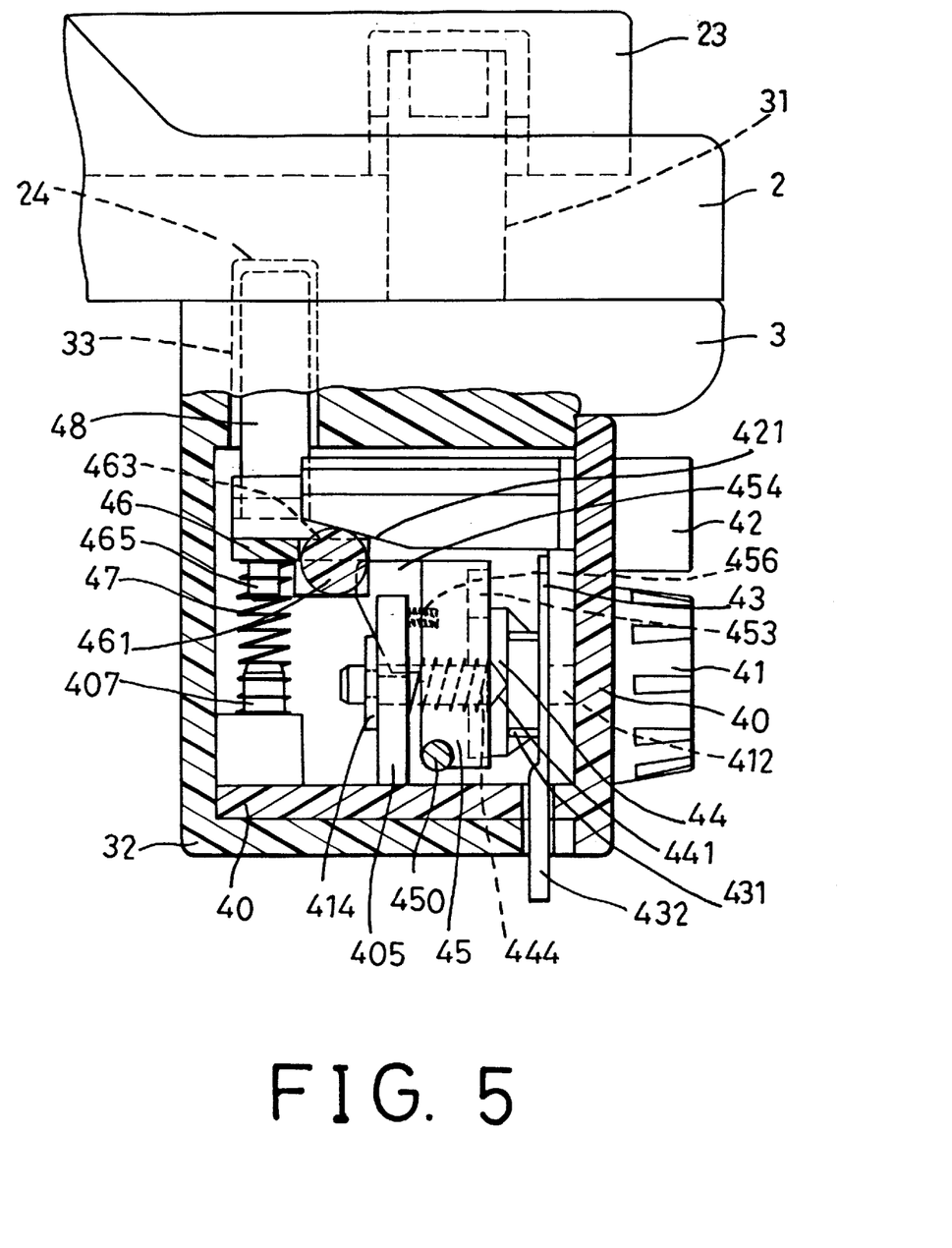
FIG. 5 a side cross-sectional view of the automobile steering lock in the present invention.
Figure 6:
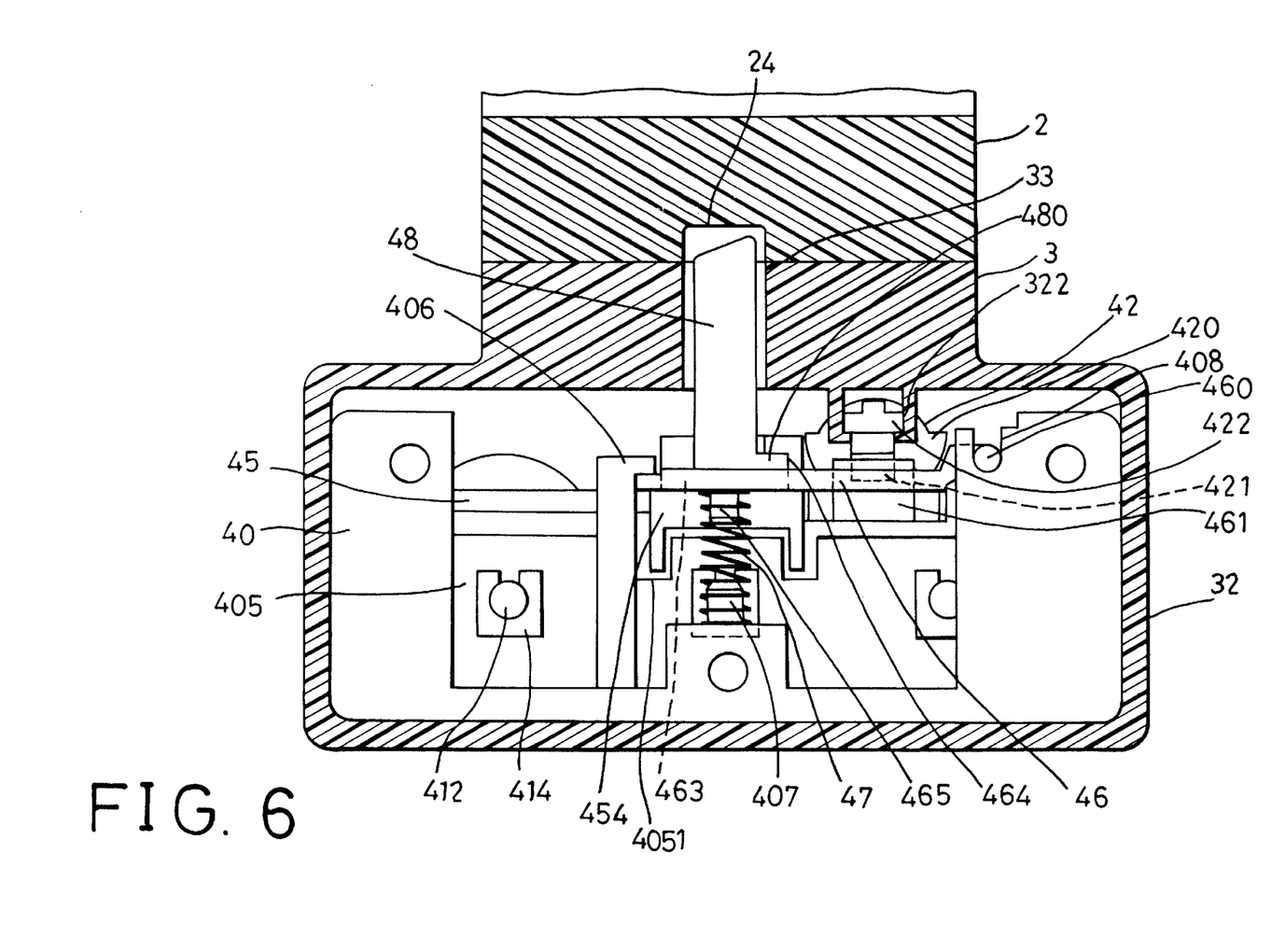
FIG. 6 is a rear cross-sectional view of the automobile steering lock in the present invention.
Figure 7:
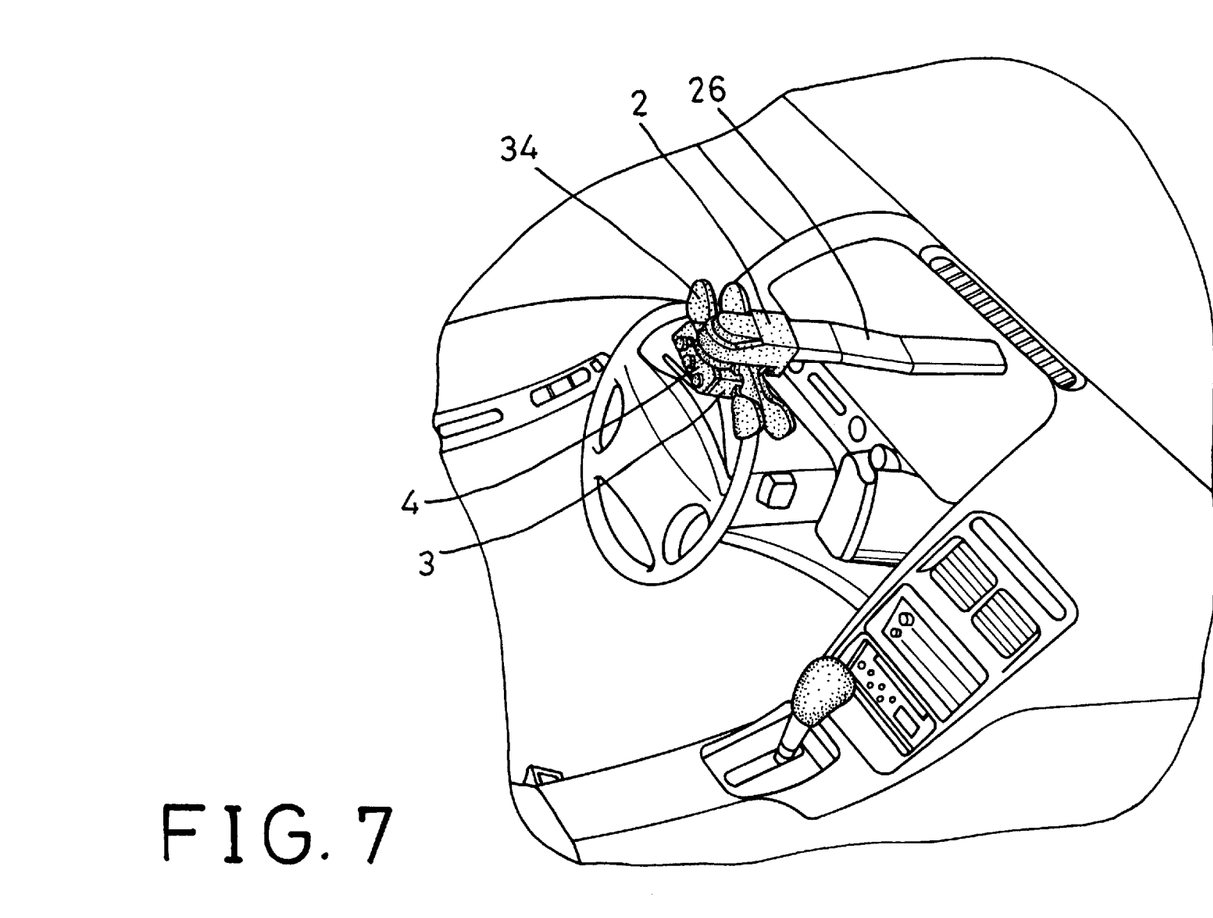
FIG. 7. is a perspective view of the automobile steering lock locked on the steering wheel in the present invention.

In using this lock on the steering wheel of an automobile, referring to FIGS. 5, 6 and 7, firstly the three number buttons 41 are rotated for an angle, rotating the wheels 44 to disengage the slots 441 of the three wheels 44 from the projections 453 of the recesses 451 of the control plate 45. Meanwhile the rear wall of the wheels 44 push rearward the control plate 45 to a vertical condition, with the control plate 45 pushing the recovery spring 456, with the projecting wall 454 of the control plate 45 extends to the rear of the fix plate 405 of the base 40. Then the press plate 46 is pushed by the coil spring 47, becoming horizontal with the left end stopped by the stop plate 406. Meanwhile the stop flat plate 463 of the press plate 46 rests on the projecting wall 454 of the control plate 45, and the deadbolt 48 is pushed up by the press plate 46, letting its upper end extend in the engage hole 24 of the body member 2, locking the body member 2 with the housing 3 securely. As the projecting wall formed by the stop flat plate 463 of the press plate 46 rests on the projecting wall 454 of the control plate 45 so that the press plate 46 is impossible to be pressed down. Thus, the press button 42 cannot be press inward to force the press plate 46 to move down for unlocking unless the user rotates the three number buttons 41 to match their numbers to the correct coded number for unlocking the lock means 4. Then the deadbolt 48 stays securely in the deadbolt hole 24 of the body member 2, with the housing 3 impossible to be rotated, acquiring the purpose of locking this lock on the steering wheel.

Figure 8:
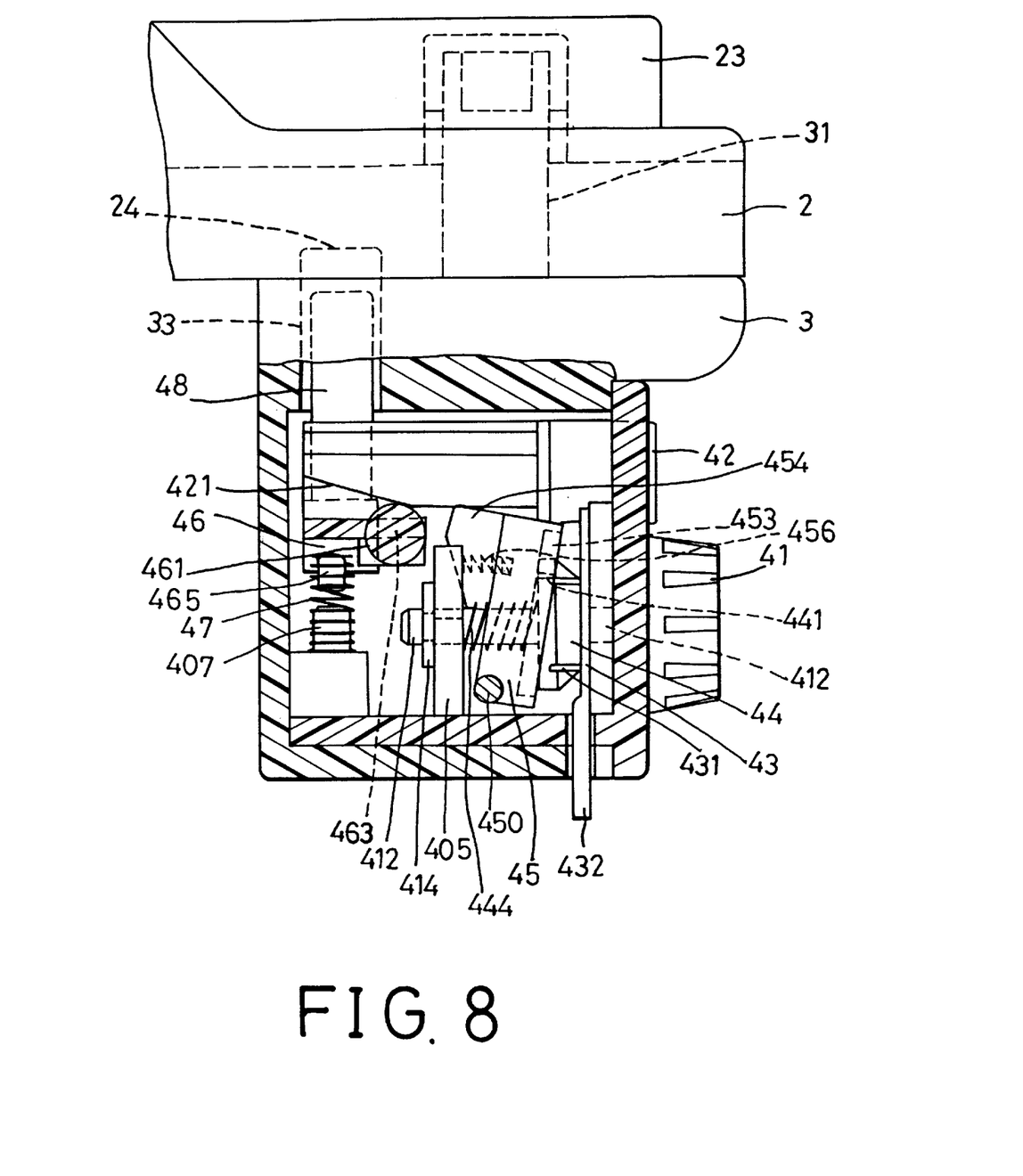
FIG. 8 is a side cross-sectional view of the automobile steering lock unlocked in the present invention.
Figure 9:
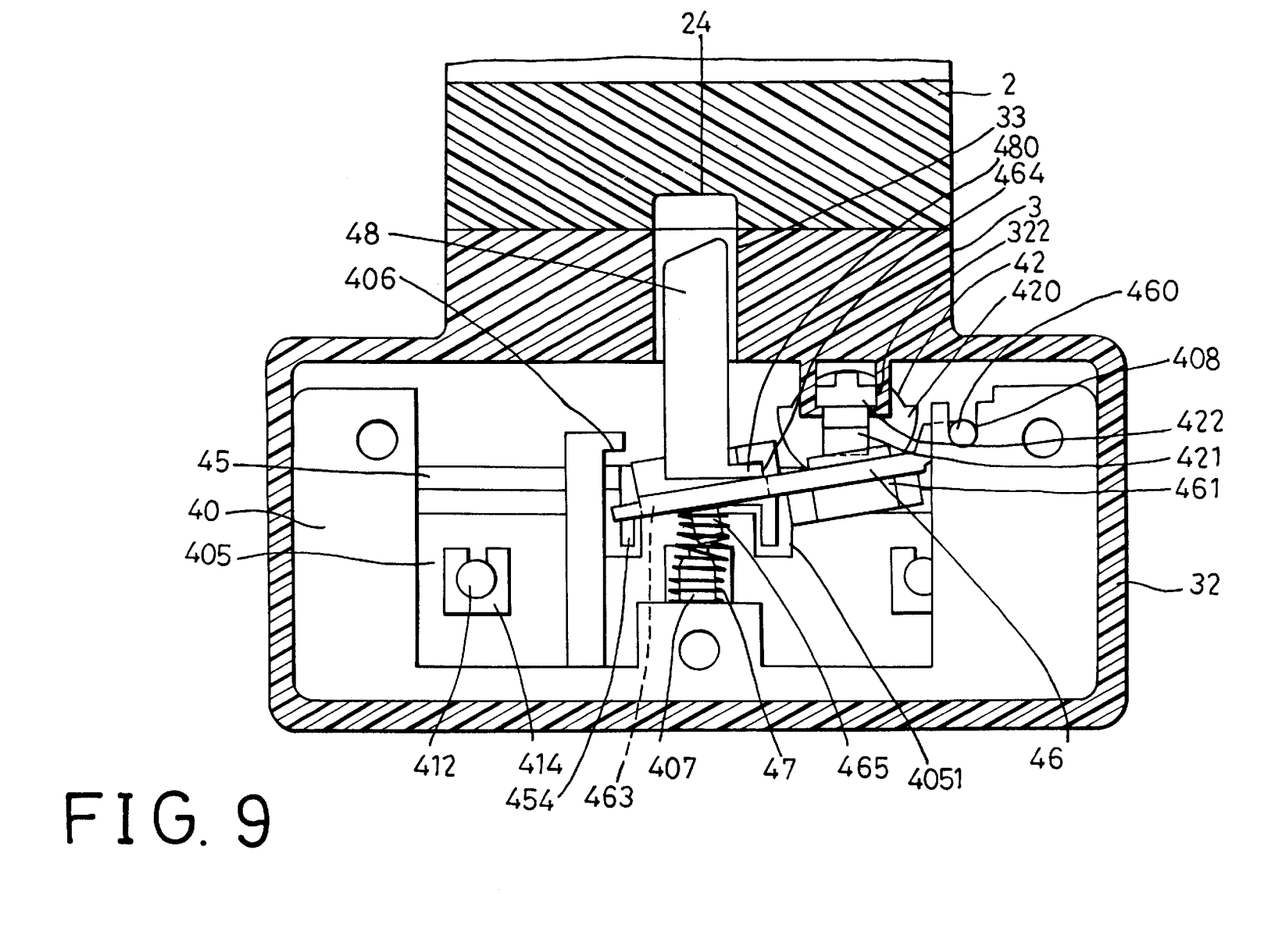
FIG. 9 a rear cross-sectional view of the automobile steering lock unlocked in the present invention.

In unlocking this lock, referring to FIGS. 8 and 9, the three number buttons are rotated to let the coded numbers moved to the unlocking position, with the wheels 44 rotated by the number buttons 41, permitting the slots 441 of the wheels 44 engage the projections 453 of the recesses 451 of the control plate 45, with the rear wall falling in the recesses 451 of the control plate 45. Then the wheels 44 no longer push rearward, and the recovery spring 456 recovers its resiliency, pushing the control plate 45 forward, with the control plate 45 sloping forward with the posts 450 functioning as pivots, with the projecting wall 454 move forward and no longer extending to the rear of the fix plate 405 of the base 40 so that the stop plate 463 no more rests on the projecting wall 454 of the control plate 45. Then the press button 42 can be pressed inward, with the sloped surface 421 pushing the roller 461 of the press plate 46, with the press plate 46 sloping down with the posts 460 as pivots to let its left end move down to press the coil spring 47, so that the deadbolt 48 may be lowered down by the sloping down of the press plate 46, and the top of the deadbolt 48 may disengage from the deadbolt hole 24 of the body member 2. Then the housing 3 can be rotated to let this lock be taken away from the steering wheel. If the user lets loose the press button 42, the coil spring 47 may recover its resiliency, pushing the press plate 46 up to the horizontal position, with the roller 461 pushing the sloped surface 421 of the press button 42 to let the press button 42 return to the pressing position.

Figure 10:
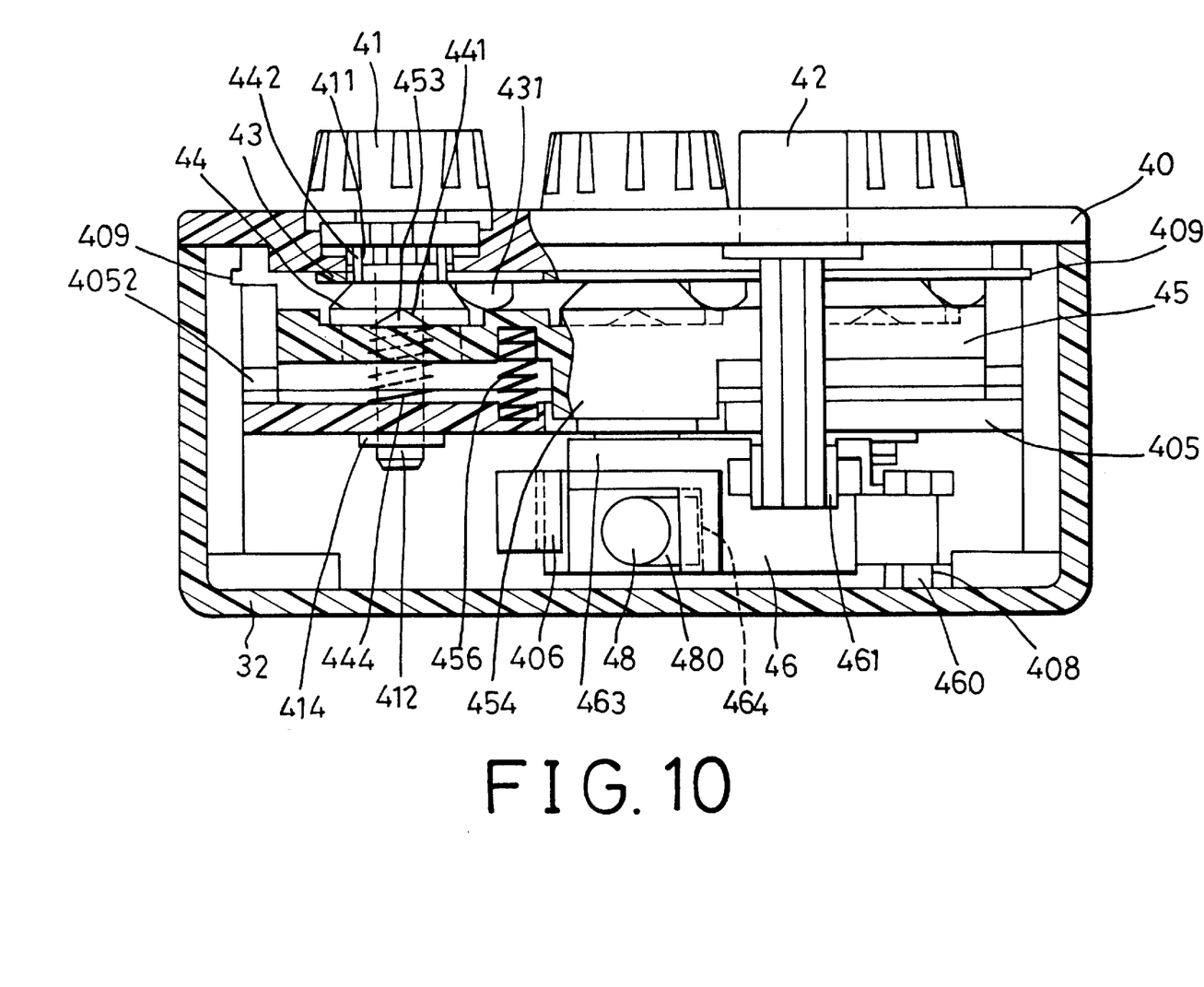
FIG. 10 is an upper cross-sectional view of the automobile steering lock with an adjust plate not pulled in the present invention; and, FIG. 11 is an upper cross-sectional view of the automobile steering lock with the adjust plate pulled for setting the code number in the present invention.
Figure 11:
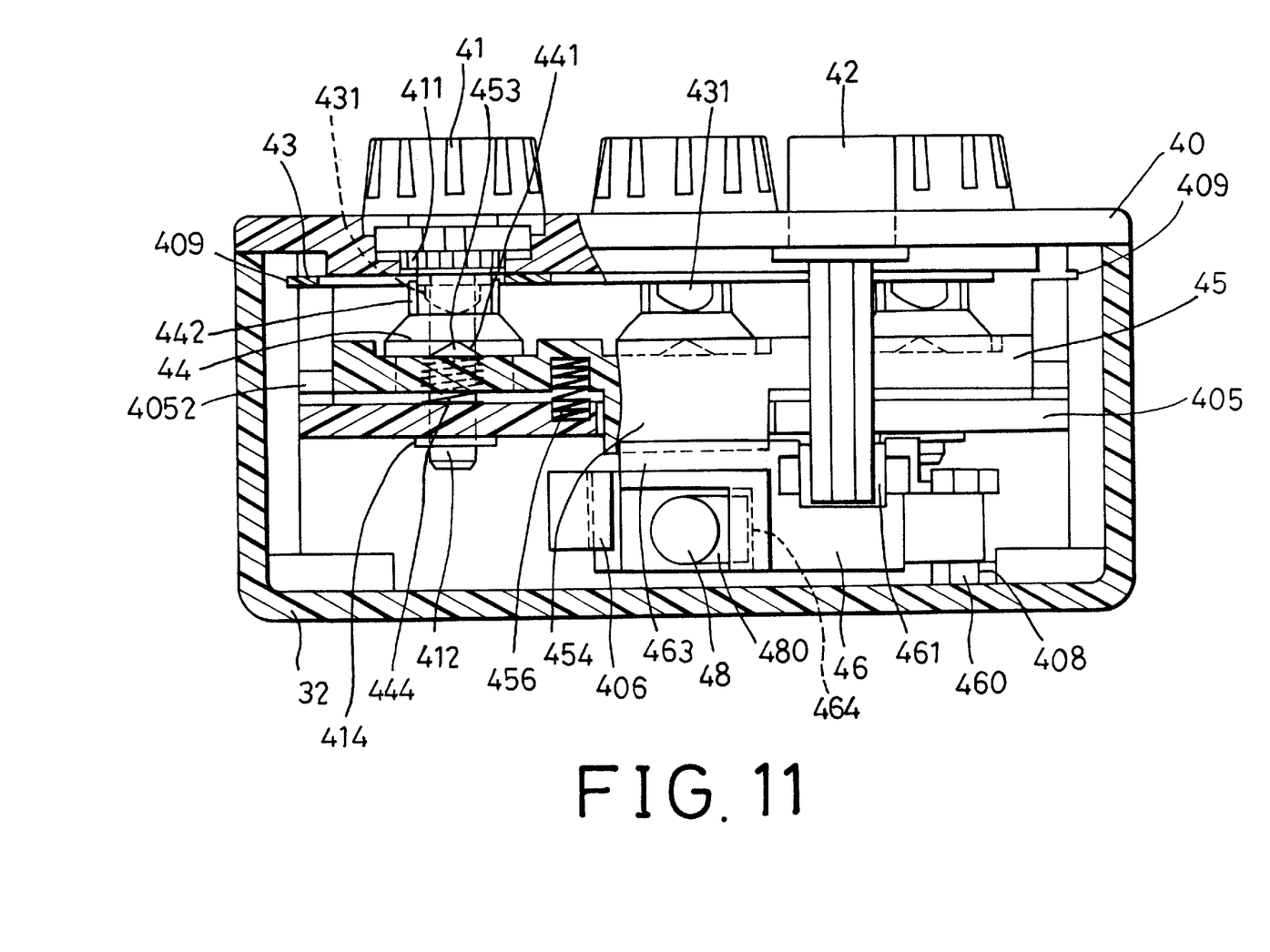

The coded number for unlocking this lock can be set freely by a user. Referring to FIGS. 5, 10 and 11, a user only pulls the push rod 432 of the adjust plate 43 located in the slot 321 of the lock housing 32 of the housing 3 to the left side from the position shown in FIG. 10 to the position shown in FIG. 11, forcing the right side of the adjust plate 43 to fit in the right vertical groove 409 and the left side thereof leave the left vertical groove 409 of the base 40. Then the semi-round sidewise projections 431 of the adjust plate 43 will push the three wheels rearward to push the recovery springs 444, forcing the keys 442 disengage from one of the engage grooves 411 of the three number buttons 41. Then the number buttons 41 can no longer rotate the wheels 44, and rotate idly so that the number buttons may be rotated and adjusted to the coded number a user wants. After all the three number buttons 41 are all adjusted to a new coded number, the adjust plate 43 is again pushed from the position shown in FIG. 11 to that shown in FIG. 10, i.e. from the left side to the right side. Then the wheels 44 are no longer pushed by the semi-round sidewise projections 431 and pushed by the recovery springs 444 forward, forcing the keys 442 to engage one of the engage grooves 411 so as to finish and adjust the coded number for unlocking.

The automobile steering lock in the invention has the following advantages, as can be understood from the aforesaid description.

1. It does not need a key to lock and unlock, getting rid of the trouble of carrying a key.

2. It cannot be unlocked, unless the three number buttons are all rotated to the coded number for unlocking, preventing it from pried open by a key or a special tool by thieves.

3. The coded number for unlocking can be readily and freely adjusted by a user as wanted, enhancing anti-theft effectiveness.

While the preferred embodiment of the invention has been described above, it will be recognized and understood that various modifications may be made therein and the appended claims are intended to cover all such modifications which may fall within the spirit and scope of the invention.

What is claimed is:

1. An automobile steering lock comprising:

a body member having a sticking rod formed in a rear large portion;

a housing pivotally connected to a front end of said body member and having a lock housing formed in a front portion;

and characterized by a locking means contained in said lock housing of said housing, said locking means having a base for positioning a plurality of number buttons for controlling a control plate located inside a front wall of said base to move, said control plate having a projection wall; a press plate for moving said control plate up and down, having one end pivotally connected to said base, and the other end movable up and down, a roller placed at a right side, and a stop wall formed to extend forward from a front bottom, and a fitting opening formed in a middle upper portion; a coil spring located under said press plate to elastically push said press plate up after compressed; a deadbolt having a lower end formed with a hook hooking in said fitting opening of said press plate, and the other end extending up through said housing and in said body member for locking; a press button having a front end extending forward out of said locking means, and the other end having a sloped surface to rest on said roller of said press plate; all said number buttons rotated to the coded number preset for unlocking, then said press button pressed inward to force said deadbolt move down to disengage from said body member to unlock, without using a key but using the coded number for unlocking to acquire anti-theft effectiveness.

2. The automobile steering lock as claimed in claim 1, wherein said lock housing is provided with a rail in an upper side, said press button is provided with a guide block projecting on an upper surface, and said guide block can move along said rail steadily.

3. The automobile steering lock as claimed in claim 1, wherein said base is provided with two pivotal grooves in one side of an upper portion, a vertical stop plate fixed on a rear portion, and an upright post formed beside said vertical stop plate, and said press plate having two aligned posts formed at a right side fitting pivotally in said two pivotal grooves, a left side resting under said stop plate, and a post formed on the bottom to face said post of said base for a coil spring to fit around them for pushing up said press plate after said coil spring is compressed.

4. The automobile steering lock as claimed in claim 1, wherein said press button has a stop formed just behind a front portion, preventing said press button from falling off said base.

* * * * *